Patented Aug. 14, 1945

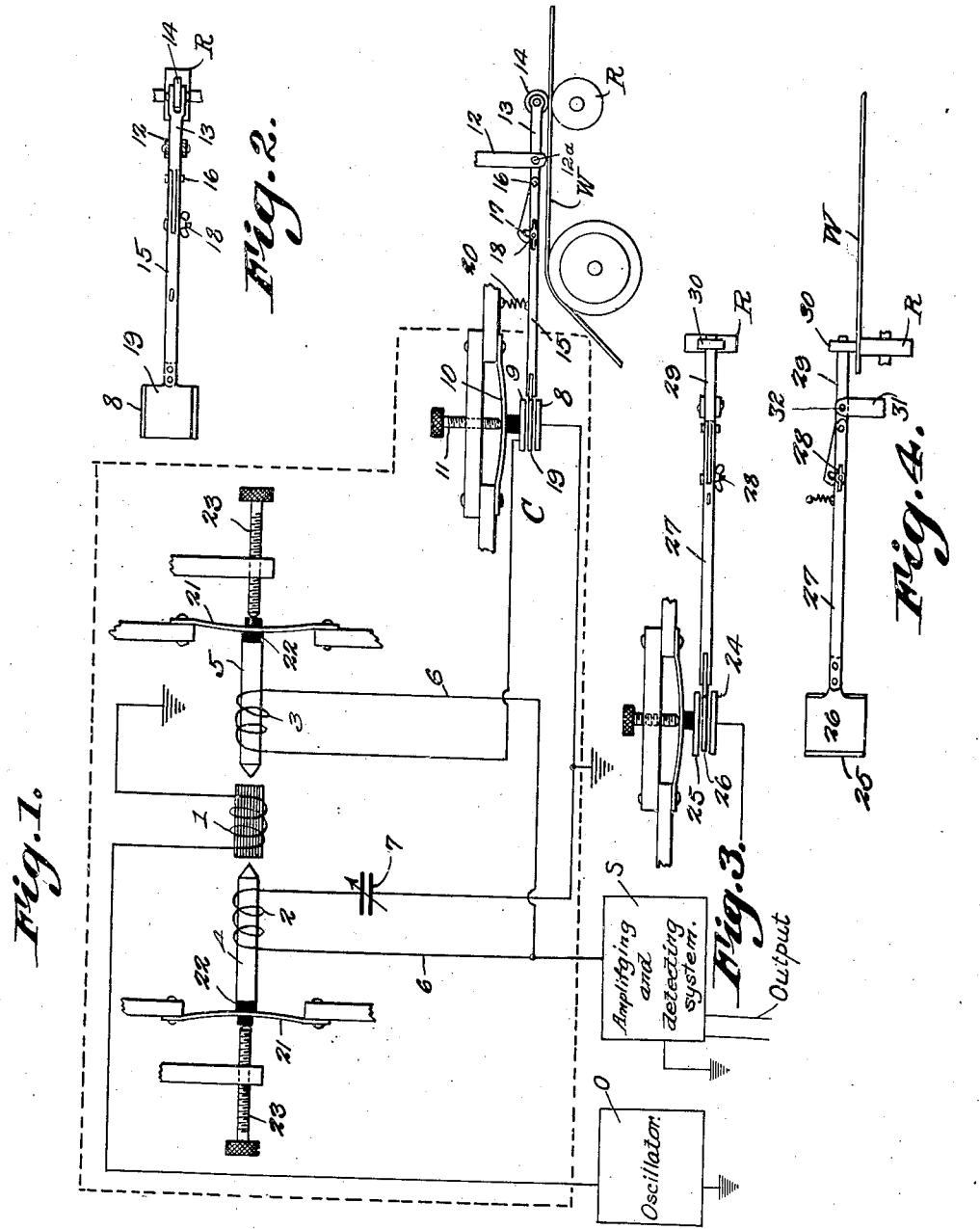

2,381,990

UNITED STATES PATENT OFFICE 2,381,990

MEANS FOR DETECTING STRUCTURAL FLAWS IN SHEET MATERIAL

Charles Stevens, Wellston, Ohio

Application February 17, 1943, Serial No. 476,235

4 Claims. (Cl. 177—311)

This invention relates to a means for detecting structural flaws in sheet material such as a web of paper, textile or the like, the apparatus employed being designed primarily for detecting undesirable variations in thickness of the material under test.

A further object is to provide a simple and compact apparatus which will detect minute variations in thickness away from normal while the material is travelling at any speed.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred forms of the invention have been shown.

In said drawing

Figure 1 is a view partly in diagram and partly in section of the complete apparatus.

Figure 2 is a plan view of the flaw-locating device forming a part of the apparatus.

Figure 3 is a plan view of a modified form of flaw-locating device.

Figure 4 is a side elevation thereof, the same being shown in contact with the material under test.

The invention includes, as an essential part thereof, a generator and an amplifying and detecting system such as disclosed, for example, in my co-pending application filed on Feb. 17, 1943, Serial No. 476,234. In said generator there is utilized a feeder coil 1 located in an oscillator circuit from oscillator O whereby a high-frequency current is fed to the feeder coil. This feeder coil is interposed between opposed pick-up coils 2 and 3 which are 180° out of phase and have cores 4 and 5 respectively consisting of permanent magnets of high permanence.

The outer terminals of the opposed coils 2 and 3 are electrically connected, as at 6, to an amplifying and detecting system S which may be any suitable type known in the art, and may advantageously be the circuit shown in my said copending application, Serial No. 476,234. The inner terminal of one of the coils is electrically connected to ground through a variable condenser 7, while the inner terminal of the other coil is electrically connected to ground through a condenser forming an essential part of the present invention and indicated generally at C.

Condenser C includes a stationary plate 8 connected to ground as shown, while another plate 9 which is insulated therefrom by space, is resiliently supported by a spring 10 joined thereto but insulated therefrom. By means of an adjusting screw 11 this spring can be bowed or sprung away from normal position so as to move the plate 9 closer to the plate 8. By reversing the rotation of the screw, however, the plate 9 can be caused to move away from plate 8 under the action of the tensioned spring 10.

Material to be tested for thickness and which preferably is in the form of a continuous web W, is adapted to be passed over a supporting roll R, and pivotally mounted as at 12ª within a fixed structure 12 is a lever 13 one end of which carries a roller 14. This lever can have an extension arm 15 pivotally connected thereto as at 16 so as to be adjustable angularly relative thereto, any suitable means, such as a slot 17 and a clamping bolt 18, being employed for holding the arm in any position to which it might be adjusted relative to the lever.

An auxiliary condenser plate 19 is carried by arm 15 and is supported between but out of contact with the plates 8 and 9, and when roller 14 is supported in spaced relation to the roll R by a portion of the web which is of proper thickness, the plate 19 will be equally spaced from the two plates 8 and 9, any necessary adjustment at 16, 17 and 18 being effected to bring the plate to this position. Auxiliary plate 19 is substantially parallel to pivot 12ª. A coiled spring 20 or the like can be employed for exerting a constant pull on the arm 15 so as to maintain roller 14 in contact with the web.

It is desirable to effect a balance of the generator circuit first by shifting the cores 4 and 5 with their windings carried thereon toward or from the coil 1 to equalize the induced voltages. This can be done by providing bow springs 21 connected by insulating material 22 to the respective cores. These springs, when in normal positions, hold the cores 4 and 5 with their windings maximum distances away from the coil 1. By means of adjusting screws 23, however, the springs can be placed under tension and the cores thrust with precision toward the coil 1.

By reversing the screws the springs can be utilized for moving the cores apart.

With material of standard or approved thickness between roller 14 and roll R, with plate 19 adjusted to be accurately centered between the plates 8 and 9, and with the capacity of the condenser regulated by adjustment of plate 9 relative to plate 8, the adjustable condenser 7 is adjusted so as to bring the generator circuit into perfect balance. As this circuit is tuned to resonance there will be no change as long as the thickness of the material W under test remains unvaried.

When, however, a thick portion or a thin portion of the web arrives between the roller 14 and the roll R, the auxiliary plate 19 will be caused to shift toward one or the other of the plates 8 and 9 with the result that the capacity in the condenser C will be disturbed. This will throw the coil 3 out of balance with the coil 2 with the result that the resultant being amplified and detected, will indicate instantly that a defect has been located in the material under test. The output of the detector may be connected to any signaling or actuating means such as a solenoid controlling classification of sheets as perfect or defective, as described for instance in my said copending application, Serial No. 476,234.

Instead of having the interposed plate of the condenser movable toward or from the plates 8 and 9 as shown in Figure 1, a modified structure such as illustrated in Figures 3 and 4 can be utilized. This includes a fixed condenser plate 24, an adjustable condenser plate 25 insulated therefrom by space and adjustably mounted in the same manner as shown, for example, in Figure 1, and an intermediate or movable auxiliary plate 26 carried by an extension arm 27 adjustably connected at 28 to a lever 29. This lever carries a roller 30 adapted to travel on the web W of material under test at a point where the web is supported by a roll R.

In this structure lever 29 and arm 27 are adapted to swing in the plane occupied by the plate 26 whereas in the other structure shown in Figures 1 and 2, the lever swings in a plane at right angles to that of the plate 19. The lever 29 is pivotally mounted at 32 on fixed structure 31. The pivot 32 is substantially perpendicular to plate 26. In the modified structure of Figs. 3 and 4, any variation in the thickness of the material under test will cause the plate 26 to swing laterally into or out of position between the plates 24 and 25 and this likewise will disturb the normal capacity of the condenser and result in throwing the generator circuit out of balance.

Apparatus such as herein described has been found especially useful for the purpose of detecting minute variations in thickness of web material under test and can be employed to supplement the tests to be effected by the apparatus disclosed in my co-pending application hereinbefore referred to.

What is claimed is:

1. In a precision instrument for translating variations in web thickness into variations in electrical capacitance, a pair of spaced principal condenser plates, a pair of rollers between which said web passes, a supporting arm pivotally carrying one of said rollers, principal pivot means for pivotally mounting said supporting arm, an elongated control arm, means for pivotally mounting said control arm on said supporting arm, adjustable clamping means for adjustably clamping said control arm with reference to said supporting arm, and an auxiliary condenser plate carried on said control arm at its end remote from its connection to said supporting arm, said arms being mounted to position said auxiliary plate displaceably between said principal condenser plates and substantially parallel thereto.

2. An instrument according to claim 1, said condenser plates being mounted substantially parallel to said principal pivot means, whereby movements of said arms displace said auxiliary plate in a direction substantially perpendicular to said principal condenser plates toward one said principal condenser plate and away from the other.

3. An instrument according to claim 1, said condenser plates being mounted substantially perpendicular to said principal pivot means, whereby movements of said arms displace said auxiliary plate in a direction substantially parallel to said principal condenser plates and into and out of the space therebetween.

4. An instrument according to claim 1 in combination with adjustable resilient supporting means for adjustably supporting one of said principal condenser plates with reference to the other principal condenser plates and adapted to move one of said principal plates perpendicularly to its face in a direction toward and away from the other said principal condenser plate, said adjustable resilient supporting means comprising a spring blade and an adjusting screw therefor substantially opposite the point of support of said principal plate on said supporting means.

CHARLES STEVENS.